United States Patent
Taguchi et al.

(10) Patent No.: US 9,229,119 B1
(45) Date of Patent: Jan. 5, 2016

(54) RADIATION MEASUREMENT APPARATUS

(71) Applicant: Mitsubishi Electric Corporation, Chiyoda-ku, Tokyo (JP)

(72) Inventors: Masaki Taguchi, Tokyo (JP); Kenichi Moteki, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 14/685,812

(22) Filed: Apr. 14, 2015

(30) Foreign Application Priority Data

Dec. 15, 2014 (JP) .................................. 2014-252740

(51) Int. Cl.
*G01T 1/24* (2006.01)

(52) U.S. Cl.
CPC ................. *G01T 1/244* (2013.01); *G01T 1/247* (2013.01)

(58) Field of Classification Search
CPC ............. G01J 1/44; G01T 1/247; G01T 1/17; H03K 4/06
See application file for complete search history.

(56) References Cited

U.S. PATENT DOCUMENTS

| 4,769,547 | A | * | 9/1988 | Uber, III ........................ 250/374 |
| 4,970,391 | A | * | 11/1990 | Uber, III ........................ 250/374 |
| 6,114,700 | A | * | 9/2000 | Blades ........................... 250/343 |
| 8,415,638 | B2 | * | 4/2013 | Esin et al. ...................... 250/375 |
| 2002/0190689 | A1 | * | 12/2002 | Nakamura et al. ............ 320/102 |
| 2006/0043315 | A1 | * | 3/2006 | Cook et al. .................... 250/489 |

FOREIGN PATENT DOCUMENTS

| JP | 61-083967 A | 4/1986 |
| JP | 3-72289 A | 3/1991 |
| JP | 2008-145264 A | 6/2008 |

* cited by examiner

*Primary Examiner* — Marcus Taningco
(74) *Attorney, Agent, or Firm* — Buchanan Ingersoll & Rooney PC

(57) ABSTRACT

To the problem of measurement error becomes larger by superimposing the leakage current to the current signal of the radiation detector, the electric charge integration unit which outputs the sawtooth pulses by the discharge of the detected to charge the radiation is connected to a time of discharging the charge and is a constant current circuit is disconnected during the charge accumulation is provided, between the constant current circuit and the charge integrator, the leakage current of the switching circuit is connected a first backflow cutoff circuit suppresses during charge accumulation, the leakage current compensation circuit connected to an input of the storage unit of charge leakage of the said the first backflow cutoff circuit second backflow cutoff circuit having a second backflow shutoff circuit of one of the backflow cutoff equivalent characteristics current has to be offset in the opposite direction.

6 Claims, 7 Drawing Sheets

RADIATION MEASUREMENT APPARATUS

BACKGROUND OF THE INVENTION

1. Field of the Invention

The present invention relates to a radiation measurement apparatus, and particularly relates to a radiation measurement apparatus that measures a radiation dose per unit time by measuring a current signal which is output from a radiation detector.

2. Description of the Background Art

Radiation measurement apparatuses which are installed in a nuclear power plant, nuclear fuel reprocessing facilities, radiation utilization facilities and the like, and in the vicinity of these facilities are required to cover a wide measurement range from a normal radiation level to a radiation level at which an accident is taken into consideration, in the measurement of a dosage rate or the like. For this reason, when an ionization chamber is used, for example, as a radiation detector, a fine and wide range of current having an order of $10^{-14}$ A (ampere) to $10^{-7}$ A which is generated as a result of the action of radiation on the ionization chamber is required to be measured with a good degree of accuracy.

As a micro-current measurement apparatus that measures such a micro-current, an apparatus is used which includes current integration means for repeating an operation in which an input current is integrated up to a predetermined value and is output, counting means for counting the number of repetitions per setting time performed by the current integration means, current integration value detection means for detecting a current integration value in the current integration means when the setting time has elapsed, and arithmetic operation means for calculating a current value of the input current on the basis of a characteristic value of the current integration means, the setting time, and the current integration value which is detected by the current integration value detection means, wherein electric charge of the input current is integrated and converted into a voltage, electric charge of a predetermined value is discharged when a sawtooth-wave output voltage reaches a voltage of a predetermined value, and is converted into a sawtooth pulse of a repetitive frequency which is proportional to the current value, a fractional count value obtained on the basis of a voltage value of a sawtooth wave-shaped pulse which is measured at a point of time when the setting time has elapsed is added to a count value obtained by counting the number of square-wave pulses in the setting time, to set the resultant value to a real count value, and a micro-current is measured on the basis of the real count value (see, for example, Patent Document 1).

In addition, there is a radiation photon counting system that performs highly-sensitive measurement in a region has a lower radiation intensity than in a current integration system of Patent Document 1. In this system, electron-hole pairs are generated at a position in which radiation photons within a radiation detector are absorbed, and transfer toward both electrodes of the detector to induce electric charge in the electrodes, whereby a current pulse is generated. The current pulse is converted into a voltage pulse which is proportional to energy of the absorbed radiation photons, a reverse bias voltage is applied to a Schottky junction in order to constitute a detector for the radiation photons, and the junction is used as a layer sensitive to radiation by depletion. In a radiation detection apparatus based on this radiation photon counting system, a technique is proposed in which a current supply circuit that supplies a current to a current input terminal of an electric charge amplifier is provided, a reverse bias leakage current flowing into the radiation detector does not flow through a feedback resistor of the electric charge amplifier by predetermined value or greater, a bias voltage is increased little by little while monitoring an output voltage of the electric charge amplifier, and a stable operation is performed (see, for example, Patent Document 2).

Further, as a technique for measuring a detection current which is obtained by detecting radiation with a high level of accuracy, particularly, a technique for correcting an error component associated with a leakage current of an element for measuring the detection current, a configuration is proposed in which an element for a leakage current having the same characteristics as the characteristics of an element for a detection current is disposed so as to have the same temperature conditions with respect to a measurement error associated with a change in temperature, particularly, when a micro-current is measured, and compensation is performed by subtracting a measurement value based on the element for a leakage current from a measurement value based on the element for a detection current (see, for example, Patent Document 3).

[Patent Document 1] JP-A-61-83967
[Patent Document 2] JP-A-3-72289
[Patent Document 3] JP-A-2008-145264

In a micro-current measurement apparatus of the related art, when the micro-current measurement apparatus is applied to a radiation measurement apparatus, a leakage current of the micro-current measurement apparatus is superimposed on a current signal of the radiation detector in an input of the micro-current measurement apparatus, and the leakage current changes depending on a temperature. Therefore, in the vicinity of the lower limit of a measurement range having an order of $10^{-14}$ A, the leakage current becomes relatively larger with respect to the current signal from the radiation detector, and thus there is a problem in that a measurement error may increase when the measurement of a low radiation dose is performed in a usage environment having a large change in temperature.

In the micro-current measurement apparatus, the maximum value of annual environmental temperature is taken into consideration in order to reduce the influence of temperature characteristics, and a heater is delicately controlled so as to make temperature constant at the maximum temperature. However, in a case of outdoor installation, in an overcoat that having the ionization chamber and the micro-current measurement apparatus housed therein, heat infiltrating from an insolation surface and heat generated inside the apparatus are radiated from a shaded surface, and thus internal temperature distribution subtly changes depending on seasons, the weather, and surrounding environmental conditions. There is a problem in that indication may fluctuate by the action on this subtle change, particularly, the temperature characteristics of a backward leakage current of a diode of a discharge circuit.

In Patent Document 3 described above, a proposal is made for correcting an error associated with the leakage current due to a change in temperature, but the element for a leakage current having the same characteristics as the characteristics of the element for a detection current is required to be disposed so as to have the same temperature conditions. For this reason, there is a problem in that actual circuit characteristics may be required to be the same as each other, and a work for selecting the characteristics from a large number of components so as to have the same characteristics may be inevitably needed.

SUMMARY OF THE INVENTION

The present invention is contrived to solve the aforementioned problems, and an object thereof is to obtain a high-accuracy radiation measurement apparatus having good temperature characteristics.

According to an aspect of the present invention, there is provided a radiation measurement apparatus including: a radiation detector that detects radiation to output a current signal; and a sawtooth wave-shaped pulse generation unit which includes an electric charge integration unit that stores the current signal which is output from the radiation detector as electric charge, and outputs a voltage signal which is proportional to the stored electric charge, a voltage comparison unit that outputs a trigger signal and outputs a square-wave pulse when the voltage signal reaches a predetermined value, and an electric charge discharge unit that discharges electric charge of a predetermined value from the electric charge which is stored in the electric charge integration unit for each output of the trigger signal, and outputs a sawtooth wave-shaped pulse that changes in a sawtooth wave shape due to the storage of the electric charge and the discharge of the electric charge, wherein the electric charge discharge unit includes a constant current circuit which is connected to an input of the electric charge integration unit through a switching circuit, connected to the electric charge integration unit during the discharge of the electric charge, and separated from the electric charge integration unit during the storage of the electric charge, a first backflow cut-off circuit, connected between the constant current circuit and the electric charge integration unit, which suppresses a leakage current of the switching circuit during the storage of the electric charge, and a leakage current compensation circuit, connected to an input of a storage unit of the electric charge, which includes a second backflow cut-off circuit having the same characteristics as that of the first backflow cut-off circuit, and leakage currents of the first backflow cut-off circuit and the second backflow cut-off circuit offset each other in opposite directions.

In the radiation measurement apparatus according to an aspect of the present invention, the electric charge discharge unit includes the constant current circuit, the switching circuit, the first backflow cut-off circuit, and the leakage current compensation circuit having the second backflow cut-off circuit, the constant current circuit outputs a current of a predetermined value, the switching circuit connects the output of the constant current circuit to the input of the electric charge integration unit during the discharge of the electric charge in the electric charge integration unit, separates the output of the constant current circuit from the input of the electric charge integration unit during the storage of the electric charge in the electric charge integration unit, and performs control so as to discharge the electric charge of a predetermined value from the electric charge integration unit for each output of a trigger signal, the first backflow cut-off circuit suppresses the leakage current of the switching circuit during the storage of the electric charge, the leakage current compensation circuit includes the second backflow cut-off circuit having the same characteristics as those of the first backflow cut-off circuit constituting the electric charge discharge unit, the leakage currents of the first and second backflow cut-off circuits offset each other in opposite directions, the leakage current compensation circuit operates so as to offset and compensate for the leakage current of the first backflow cut-off circuit constituting the electric charge discharge unit under a condition in which temperature fluctuation is suppressed by the constant temperature unit, and thus it is possible to provide a high-accuracy radiation measurement apparatus having good temperature characteristics.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

First Embodiment

Figure 1:
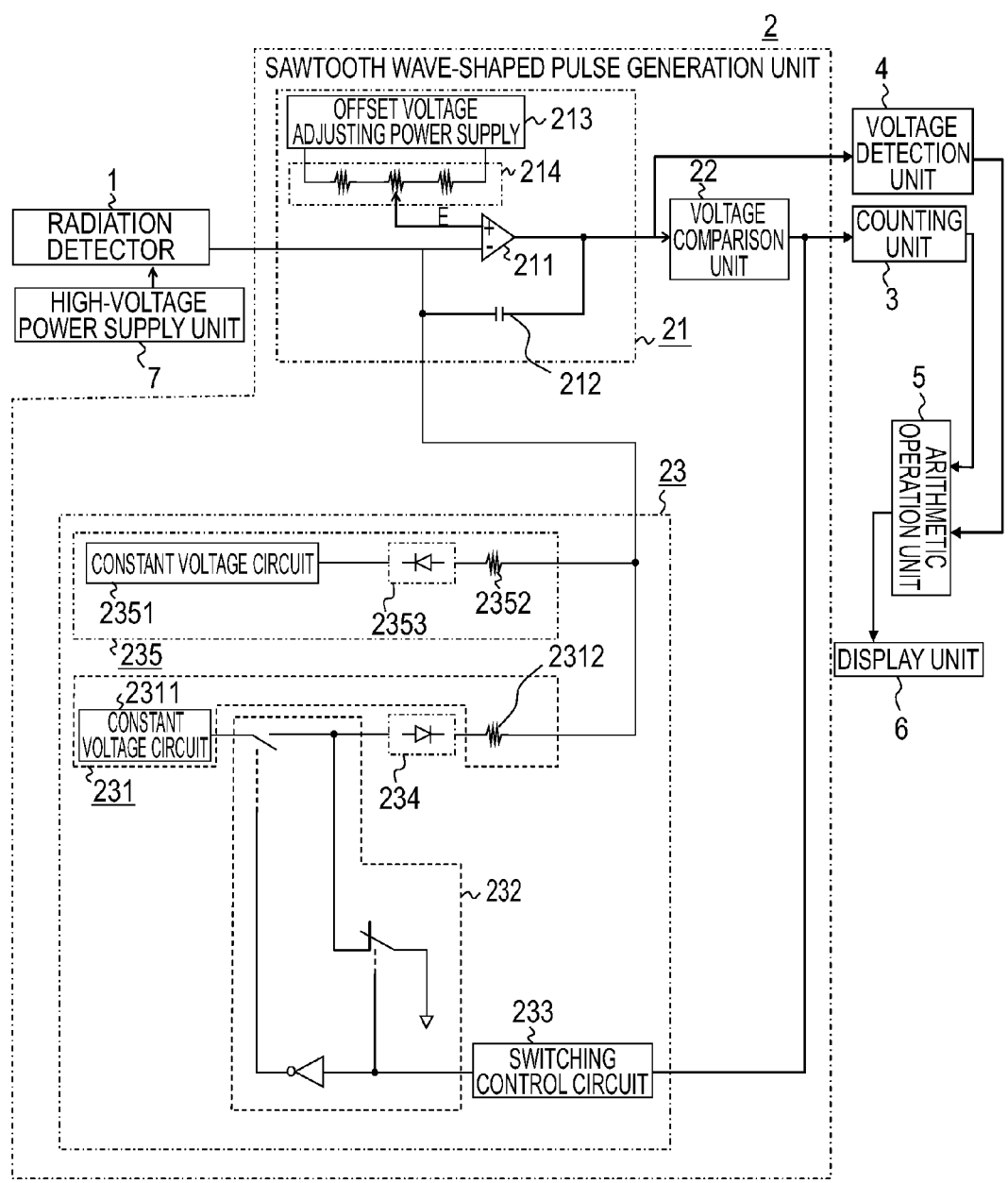
FIG. 1 is a diagram illustrating a configuration of a radiation measurement apparatus according to a first embodiment.

FIG. 1 illustrates a configuration of a first embodiment of the present invention. Meanwhile, other areas constituting the first embodiment will be described in FIG. 3 described later.

As shown in FIG. 1, a radiation measurement apparatus includes a radiation detector 1, a sawtooth wave-shaped pulse generation unit 2, a counting unit 3, a voltage detection unit 4, an arithmetic operation unit 5, a display unit 6, and a high-voltage power supply unit 7, and the radiation detector 1 detects radiation to output a current signal. The sawtooth wave-shaped pulse generation unit 2 includes an electric charge integration unit 21, a voltage comparison unit 22, and an electric charge discharge unit 23. The electric charge integration unit 21 stores electric charge of a current signal which is input from the radiation detector 1, and outputs a voltage signal which is proportional to the stored electric charge. The voltage comparison unit 22 outputs a trigger signal and outputs a square-wave pulse when the voltage signal reaches a set value. The electric charge discharge unit 23 discharges electric charge of a predetermined value from the electric charge which is stored in the electric charge integration unit 21 whenever the trigger signal is input from the voltage comparison unit 22. In the electric charge integration unit 21, the storage of electric charge and the discharge of electric charge are repeated, and thus a voltage signal is output as a sawtooth wave-shaped pulse which is changed to sawtooth wave shape with the elapse of time.

The counting unit 3 counts a square-wave pulse to output an integration count value. The voltage detection unit 4 detects a voltage value of a sawtooth wave-shaped pulse as a fixed periodic voltage value whenever a fixed periodic time which is set elapses. The arithmetic operation unit 5 obtains a fixed periodic count value for a fixed periodic time on the basis of the integration count value, obtains a fractional count value on the basis of the fixed periodic voltage value, obtains a total of count values obtained by adding the fractional count value and the fixed periodic count value, fetches the resultant value as the latest data in a data row lined up in a time-series manner up to a fixed periodic number which is set and discards the oldest data to update the data row, obtains an average counting rate by performing a moving average on the updated data row, and converts the average counting rate into an engineering value to thereby output the resultant value. The display unit 6 displays the engineering value which is output from the arithmetic operation unit 5. The high-voltage power supply unit 7 is configured to be capable of detecting radiation and outputting the above current signal by supplying a high voltage to the radiation detector 1.

Figure 2A:
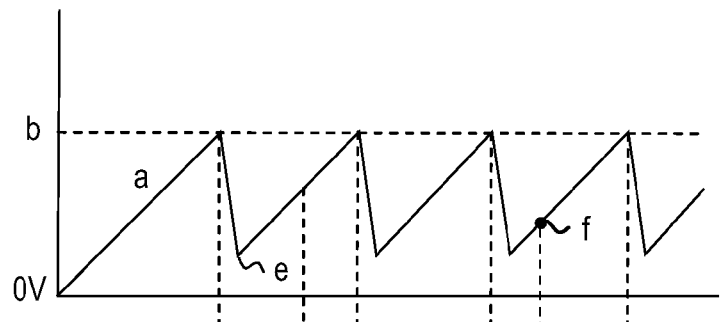
FIGS. 2A to 2C are diagrams illustrating an operation of a sawtooth wave-shaped pulse generation unit according to the first embodiment.
Figure 2B:
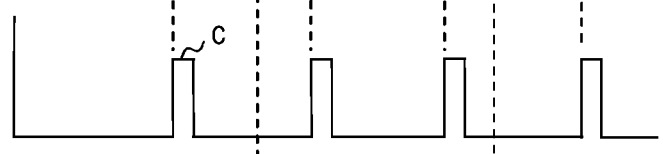
Figure 2C:
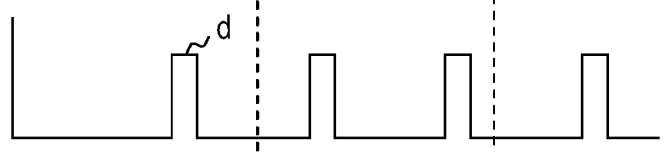

FIGS. 2A to 2C are diagrams illustrating an operation of the sawtooth wave-shaped pulse generation unit 2 according to the first embodiment; a in FIG. 2A shows a sawtooth wave-shaped pulse which is output from the electric charge integration unit 21, and c in FIG. 2B and d in FIG. 2C show a trigger signal and a square-wave pulse which are output from the voltage comparison unit 22 when the inclination portion of the sawtooth wave-shaped pulse reaches a set value b (shown in FIG. 2A). The value b determines a peak of the sawtooth wave-shaped pulse, and the discharge amount of the electric charge integration unit 21 determines a level of a bottom e of the valley of the sawtooth wave-shaped pulse. The discharge amount is stabilized even when the value b somewhat fluctuates due to a drift, a drop difference between b and e is set to a predetermined value, and thus the repetitive frequencies of the sawtooth wave-shaped pulse and the square-wave pulse as a gain are stabilized. In the arithmetic operation unit 5, at a timing when a fixed periodic time ΔT which is set has elapsed, an integration count value is input from the counting unit 3, and a voltage value f of the sawtooth pulse is input from the voltage detection unit 4.

The electric charge integration unit 21 includes an operational amplifier 211, an electric charge integration capacitor 212, an offset voltage adjusting power supply 213, and an offset voltage adjusting resistor group 214, and is configured such that electric charge of an input current is integrated and converted into a voltage by connecting the electric charge integration capacitor 212 to between the inverting input (−) and the output terminal of the operational amplifier 211. In addition, the output voltage of the offset voltage adjusting power supply 213 is divided by the offset voltage adjusting resistor group 214 and is applied to the non-inverting input (+) of the operational amplifier 211 to thereby compensate for an offset voltage of the operational amplifier 211.

The electric charge discharge unit 23 includes a constant current circuit 231, a switching circuit 232, a switching control circuit 233, a backflow cut-off circuit 234, and a leakage current compensation circuit 235. The constant current circuit 231 is constituted by, for example, a constant voltage circuit 2311 and a resistor 2312, and outputs a current having a predetermined value. The backflow cut-off circuit 234 is constituted by, for example, a diode. The switching circuit 232 performs switching connection, during the discharge of electric charge in the electric charge integration unit 21, so as to inject a discharge current having a predetermined value into the input of the electric charge integration unit 21 for a certain period of time through a forward diode of the backflow cut-off circuit 234 from the output of the constant current circuit 231, separates the output of the constant current circuit 231 from the input of the electric charge integration unit 21 during the storage of electric charge in the electric charge integration unit 21, switchably connects the anode of a diode to 0 V so that a leakage current after the separation does not flow into the input of the electric charge integration unit 21, and bypasses the leakage current from the constant current circuit 231 to 0 V. A reverse voltage +E is applied to a diode as the backflow cut-off circuit 234 by this bypass connection, and the leakage current flowing out from the diode is suppressed to a minimum. The restriction of the number of times of switching is eliminated by using, for example, a semiconductor switch as the switching circuit 232.

When a reverse voltage E which is applied to the diode of the backflow cut-off circuit 234 during the storage of electric charge in the electric charge integration unit 21 is set to have a relation of $E=V_R$, and a reverse leakage current of the diode when a reference temperature is set to $T_S$ (K is an absolute temperature) is set to $I_{RS}$, a reverse leakage current $I_R$ of any temperature T(K) is represented approximately as follows.

$$I_R = I_{RS} \cdot \exp\{\eta(T-T_S)\} \cdot \{\exp(-qV/kT)-1\} \quad (1)$$

q: electric charge amount of an electron $1.60 \times 10^{-19}$ C (coulomb)

k: Boltzmann's constant $1.38 \times 10^{-23}$ J/K (J: joule)

When the material of the diode is silicon, η is approximately 0.1/K. Therefore, Expression (1) is simplified and represented as Expression (2), the leakage current $I_R$ flows out toward 0 V, electric charge is stored by $I_R$ in a form in which a signal current is added to the electric charge integration capacitor 212, and this $I_R$ becomes a factor for an error.

$$I_R = I_{RS} \cdot \exp\{0.1 \times (T-T_S)\} \cdot \{\exp(-qV/kT)-1\} \quad (2)$$

The leakage current compensation circuit 235 includes a constant voltage circuit 2351 and a resistor 2352 similarly to the constant voltage circuit 2311 and resistor 2312 constituting the constant current circuit 231, and includes a diode as a backflow cut-off circuit 2353 similarly to the diode as the backflow cut-off circuit 234. When the constant voltage circuit 2351 outputs a voltage +2E and applies the voltage to the anode of the diode as the backflow cut-off circuit 2353, the voltage +E of the inverting input (−) $I_{RS}$ of the operational amplifier 211 is applied to the cathode of the diode. Thus, the reverse voltage +E is applied to the diode at all times similarly to the diode as the backflow cut-off circuit 234 during the storage of electric charge in the electric charge integration unit 21. Therefore, in the inverting input (−) of the operational amplifier 211, the leakage current $I_R$ flows out from the diode as the backflow cut-off circuit 234 of the constant current circuit 231 during the storage of electric charge in the electric charge integration unit 21, whereas the leakage current $I_R$ having the same amount flows in from the diode as the backflow cut-off circuit 2353 of the leakage current compensation circuit 235 in an opposite direction, and thus both the leakage currents $I_R$ of Expression (2) are canceled. A variable resistor (not shown) is built into the constant voltage circuit 2351, and a desired output voltage can be obtained by adjusting the resistor.

Regarding $I_{RS}$ of Expression (2) described above, a current having a uniform characteristic is used by screening from that of the same lot, but after incorporation, the high-voltage power supply unit 7 is set to be 0 V and is set to be in a state where there is no current output of the radiation detector 1, the offset voltage adjusting resistor group 214 is adjusted, under a condition in which a reference temperature is $T_S$, in a state where the output of the constant voltage circuit 2351 is set to +2E, and an offset is adjusted by the voltage adjusting resistor group so that a leakage current in the inverting input (−) of the operational amplifier 211 is minimized on the basis of such a condition that e of FIG. 2A does not fall below a lower limit (for example, +50 mV) which is determined in advance. Next, fine adjustment is performed so as to cancel the leakage current in the inverting input (−) of the operational amplifier 211 by adjusting the output voltage of the constant voltage circuit 2351, and the variation of $I_{RS}$ of the diode which fails to be absorbed by screening is absorbed by the adjustment of the constant voltage circuit 2351, so that each of the leakage currents $I_R$ of the diode of the backflow cut-off circuit 234 and the diode of the backflow cut-off circuit 2353 is canceled inclusive of temperature characteristics, and thus good temperature characteristics are obtained with respect to a change in minor temperature.

Meanwhile, components serving as a factor for the leakage current include the diode as the backflow cut-off circuit 234 and the electric charge integration capacitor 212. The output of the arithmetic operation unit 5 acts on the rise side in the former case, and the output thereof acts on the drop side in the latter case. In the electric charge integration capacitor 212 and other components serving as a factor for a minor leakage current, it is possible to process the leakage current and the temperature characteristics thereof in a software manner in the arithmetic operation unit 5, and to alleviate the influence to an extent that there is no problem.

In the diode as the backflow cut-off circuit 234, it is also possible to process the leakage current in a software manner in the arithmetic operation unit 5 similarly when a temperature is constant, and to alleviate the influence to an extent that there is no problem. However, since the temperature characteristics of the leakage current react hyper-sensitively to a temperature, software-based compensation in the arithmetic operation unit 5 based on the temperature signal of a temperature sensor is not likely to be made, but the leakage current can be compensated for by the leakage current compensation circuit 235 as described above.

As described above, the electric charge discharge unit 23 includes the leakage current compensation circuit 235 having the same configuration as that of the backflow cut-off circuit 234. By applying the same reverse voltage as that of the backflow cut-off circuit 234 to between the input and output and connecting the leakage current compensation circuit to the inverting input (−) of the electric charge integration unit 21, the leakage current compensation circuit 235 operates so as to offset and compensate for the leakage current of the backflow cut-off circuit 234 under a condition in which temperature fluctuation is suppressed by a constant temperature unit 8, and thus it is possible to provide a high-accuracy radiation measurement apparatus having good temperature characteristics.

Figure 3:
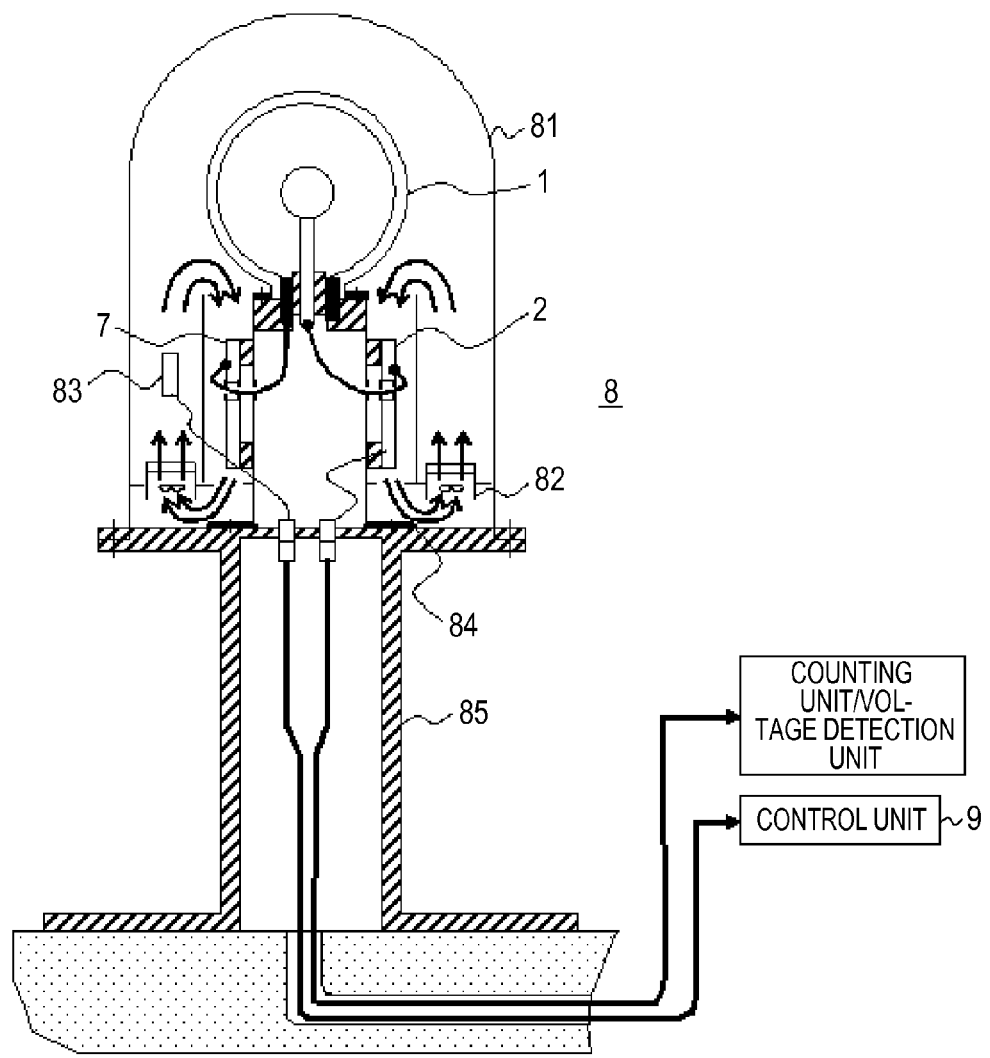
FIG. 3 is a diagram illustrating a configuration around a radiation detector according to the first embodiment.

FIG. 3 illustrates a configuration of the constant temperature unit 8 as constant-temperature air circulation means and a control unit 9. The constant temperature unit 8 includes an overcoat 81, a fan heater 82, a first temperature sensor 83, and a trestle 84. The overcoat 81 houses the radiation detector 1, the sawtooth wave-shaped pulse generation unit 2, the voltage detection unit 4, the high-voltage power supply unit 7, the fan heater 82, and the first temperature sensor 83, and is configured to prevent the outdoor air from infiltrating in a state where these components are supported by the trestle 84 and to hold the inside thereof air-tightly. The first temperature sensor 83 detects the internal temperature of the overcoat 81 and outputs a first temperature. The control unit 9 which is installed at a separated place controls the fan heater 82 on the basis of a first temperature signal from the first temperature sensor 83, controls and circulates the inside air of the overcoat 81 with a setting value which is obtained by taking the maximum value of annual environmental temperature into consideration, and maintains the inside of the overcoat 81 at a constant temperature of, for example, 35±0.5 degrees throughout the year. The temperature is made to be constant by the constant temperature unit 8, and thus the compensation function of the leakage current compensation circuit 235 is exhibited satisfactorily.

The overcoat 81 and the trestle 84 are installed on a stand 85 and are mounted independently of each other. The control unit 9 is stored in, for example, a housing similarly to the counting unit 3, the arithmetic operation unit 5, and the display unit 6, and is installed in a measurement cabin (not shown) equipped with air conditioning equipment of field installation called a building. Meanwhile, when the voltage detection unit is placed in the measurement cabin, a buffer amplifier is installed in the overcoat 81, and the current of a sawtooth pulse which is output to the voltage detection unit is amplified by the buffer amplifier, thereby allowing noise resistance to be reinforced.

Second Embodiment

Figure 4:
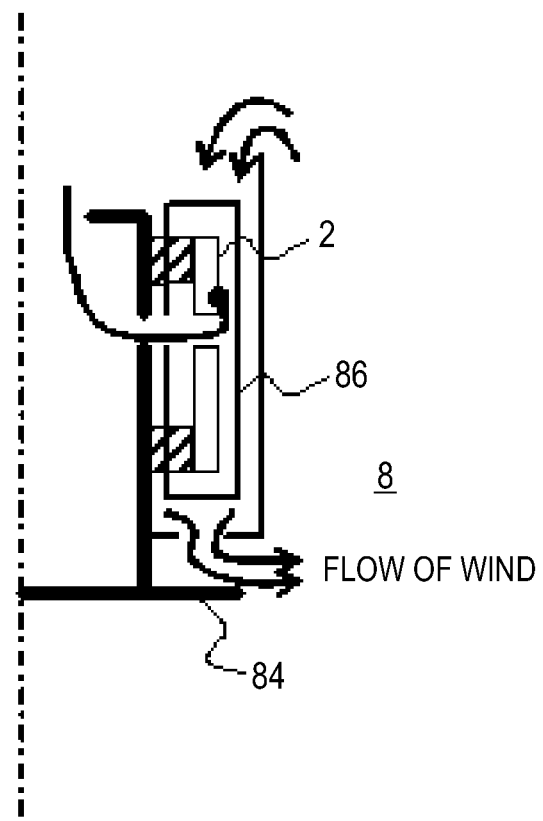
FIG. 4 is a diagram illustrating a flow of the wind and a shape of a trestle according to a second embodiment.

In a second embodiment, the structure of the constant temperature unit 8 shown in FIG. 3 is changed, and, as shown in FIG. 4, the sawtooth wave-shaped pulse generation unit 2 is stored in a metal case 86 in the inside of the overcoat 81. In this manner, by the pulse generation unit being stored in the metal case 86, the pulse generation unit is electrically shielded and is not brought into direct contact with the compelling flow of the air due to the fan heater 82. Therefore, it is possible to improve noise resistance with respect to the sawtooth wave-shaped pulse generation unit 2 sensitive to electricity and temperature, and to exhibit an effect of improving temperature stability.

Third Embodiment

Figure 5:
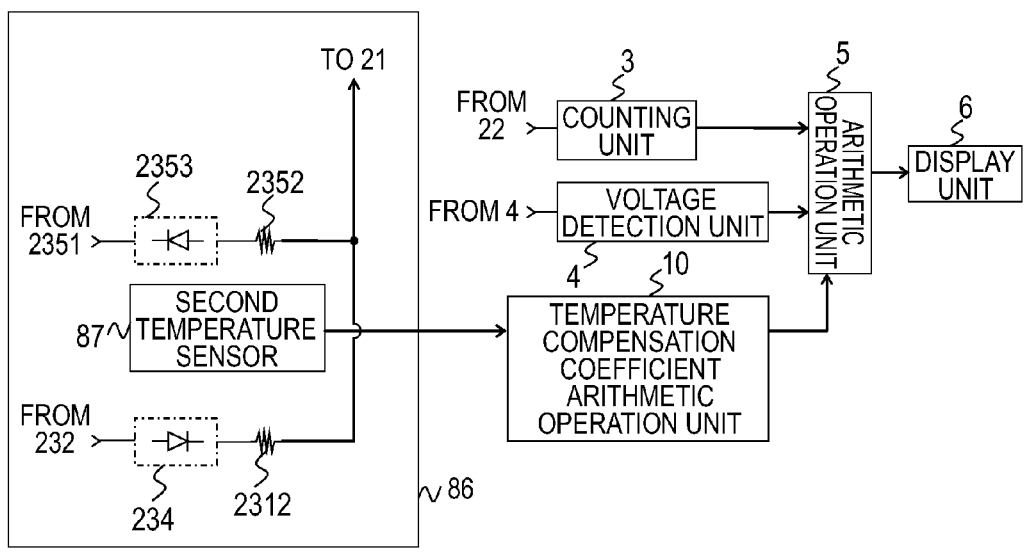
FIG. 5 is a diagram illustrating an area which is associated with the arrangement of a temperature sensor according to a third embodiment.

In a third embodiment, as shown in FIG. 5, the constant temperature unit 8 includes a second temperature sensor 87, and the typical temperature of a space of the backflow cut-off circuit 234 is measured in the inside of the metal case 86 to output a temperature signal. A temperature compensation coefficient arithmetic operation unit 10 has, for example, temperature acquired in a factory test phase and data of a table of temperature compensation coefficients stored therein, to thereby determine a temperature compensation coefficient in collation therewith and output the temperature signal to the arithmetic operation unit 5. The arithmetic operation unit 5 performs temperature compensation of a counting rate on the basis of the temperature compensation coefficient from the temperature compensation coefficient arithmetic operation unit 10, thereby allowing a higher-accuracy engineering value to be obtained.

Fourth Embodiment

Figure 6:
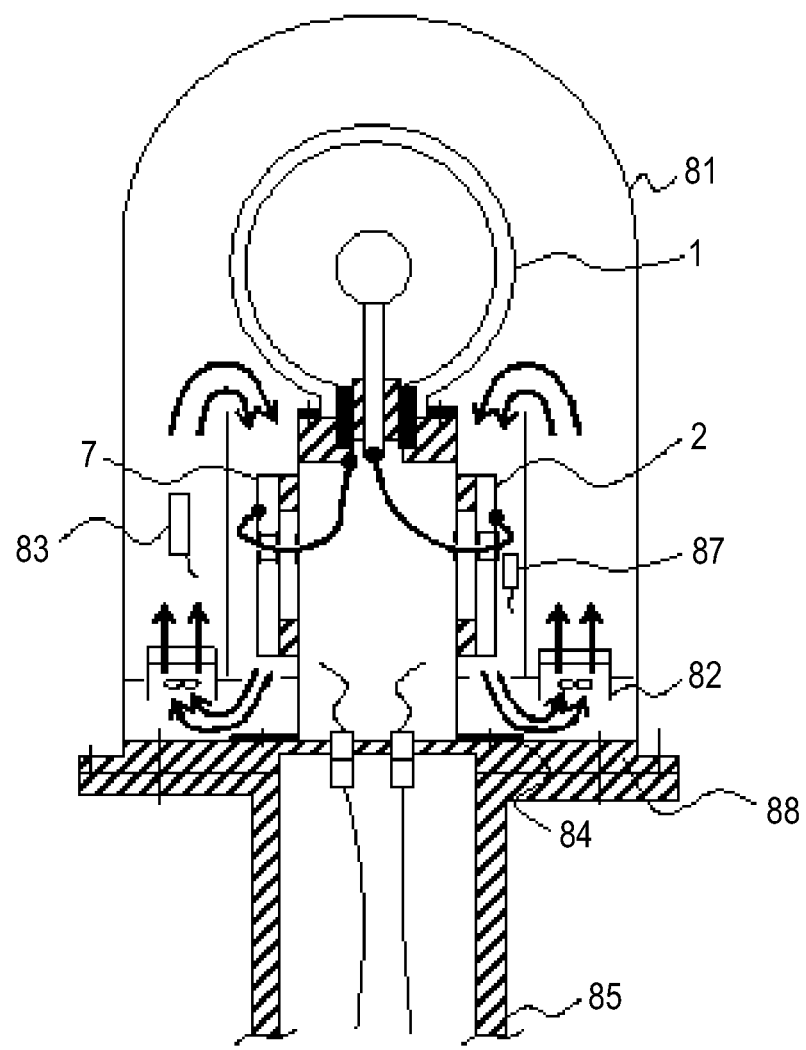
FIG. 6 is a diagram illustrating a configuration around a radiation detector according to a fourth embodiment.

In a fourth embodiment, as shown in FIG. 6, in the constant temperature unit 8, the overcoat 81 is directly mounted to the stand 85, a thermal insulating plate 88 is provided between the stand 85 and the trestle 84, and the transfer of heat from the stand 85 and the overcoat 81 to the trestle 84 is blocked, thereby allowing the internal temperature fluctuation of the overcoat 81 to be further suppressed.

Fifth Embodiment

Figure 7:
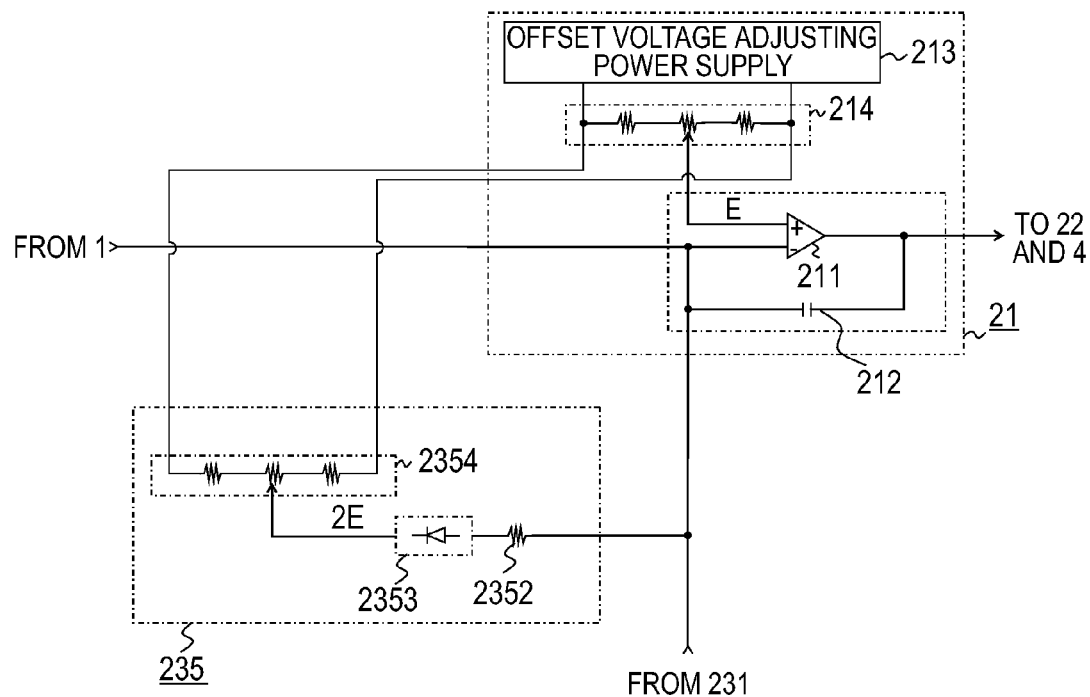
FIG. 7 is a diagram illustrating a configuration around a leakage current compensation circuit according to a fifth embodiment.

In a fifth embodiment, as shown in FIG. 7, a voltage is supplied from the offset voltage adjusting power supply 213 instead of the constant voltage circuit 2351 in the leakage current compensation circuit 235 of the first embodiment, a compensating current adjusting resistor group 2354 is included instead of the variable resistor which is built into the constant voltage circuit 2351, the output voltage of the offset voltage adjusting power supply 213 is adjusted basically to +2E by the compensating current adjusting resistor group 2354, and the leakage current is compensated for by performing fine adjustment from +2E. Therefore, it is possible to cancel the fluctuation of the leakage current due to power supply variation through power supply sharing, and to reduce a cost.

Meanwhile, in the present invention, each of the embodiments can be freely combined within the scope of the present invention, or each of the embodiments can be appropriately modified or omitted.

Various modifications and alterations of this invention will be apparent to those skilled in the art without departing from the scope and spirit of this invention, and it should be understood that this is not limited to the illustrative embodiments set forth herein.

What is claimed is:

1. A radiation measurement apparatus comprising:
   a radiation detector that detects radiation to output a current signal; and
   a sawtooth wave-shaped pulse generation unit which includes
      an electric charge integration unit that stores the current signal which is output from the radiation detector as electric charge, and outputs a voltage signal which is proportional to the stored electric charge,
      a voltage comparison unit that outputs a trigger signal and outputs a square-wave pulse when the voltage signal reaches a predetermined value, and
      an electric charge discharge unit that discharges electric charge of a predetermined value from the electric charge which is stored in the electric charge integration unit for each output of the trigger signal, and
   outputs a sawtooth wave-shaped pulse that changes in a sawtooth wave shape due to the storage of the electric charge and the discharge of the electric charge,
   wherein the electric charge discharge unit includes a constant current circuit which is connected to an input of the electric charge integration unit through a switching circuit, connected to the electric charge integration unit during the discharge of the electric charge, and separated from the electric charge integration unit during the storage of the electric charge, a first backflow cut-off circuit, connected between the constant current circuit and the electric charge integration unit, which suppresses a leakage current of the switching circuit during the storage of the electric charge, and a leakage current compensation circuit, connected to an input of a storage unit of the electric charge, which includes a second backflow cut-off circuit having the same characteristics as that of the first backflow cut-off circuit, and
   leakage currents of the first backflow cut-off circuit and the second backflow cut-off circuit offset each other in opposite directions.

2. The radiation measurement apparatus according to claim 1, wherein the radiation detector and the sawtooth wave-shaped pulse generation unit are provided in a constant temperature unit, and the constant temperature unit includes an overcoat, constant-temperature air circulation means which controls and circulates inside air of the overcoat with a setting value which is obtained by taking a maximum value of annual environmental temperature into consideration, and a support metal fitting for installing the overcoat self-supportedly.

3. The radiation measurement apparatus according to claim 2, wherein the constant temperature unit includes a metal case, and has the sawtooth wave-shaped pulse generation unit housed in the metal case.

4. The radiation measurement apparatus according to claim 3, wherein in the metal case, a typical temperature of a space of the first backflow cut-off circuit is measured to output a temperature signal, and temperature compensation of a counting rate is performed on the basis of the temperature signal.

5. The radiation measurement apparatus according to claim 2, wherein a thermal insulating plate is provided between the overcoat and the support metal fitting.

6. The radiation measurement apparatus according to claim 1, wherein the leakage current compensation circuit is capable of making a voltage difference which is applied between its input and output variable, and a power supply that generates the voltage difference is shared with a power supply that generates a voltage difference which is applied an between input and an output of the switching circuit.

* * * * *